(12) United States Patent
Saito (10) Patent No.: US 6,378,390 B2
(45) Date of Patent: *Apr. 30, 2002

(54) MOUNTING MECHANISM AND HEAD MOUNTED APPARATUS

(75) Inventor: Yoshihiro Saito, Hachioji (JP)

(73) Assignee: Mixed Reality Systems Laboratory Inc., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,270

(22) Filed: Mar. 1, 1999

(30) Foreign Application Priority Data

Aug. 17, 1998 (JP) ............................................ 10-230961

(51) Int. Cl.[7] ................................................ H04N 13/00
(52) U.S. Cl. ........................... 74/159; 192/41 R; 2/6.2; 2/171; 2/422; 2/424; 345/8
(58) Field of Search ........................ 74/159, 144; 2/6.2, 2/171, 417, 418, 419, 422, 424, 906; 192/41 R; 345/8

(56) References Cited

U.S. PATENT DOCUMENTS

| | | | | | |
|---|---|---|---|---|---|
| 3,787,109 A | * | 1/1974 | Vizenor | ...................... | 350/302 |
| 4,577,347 A | * | 3/1986 | Connon | .............................. | 2/6 |
| 4,670,912 A | * | 6/1987 | Hart | ............................. | 2/209.1 |
| 4,907,296 A | * | 3/1990 | Blecha | .............................. | 2/6 |
| 4,952,024 A | * | 8/1990 | Gale | ............................ | 350/143 |
| 5,184,231 A | * | 2/1993 | Ellis | ............................. | 359/13 |
| 5,642,221 A | * | 6/1997 | Fischer et al. | .............. | 359/477 |
| 5,682,172 A | * | 10/1997 | Travers et al. | ................. | 345/8 |
| 6,012,176 A | * | 1/2000 | Daley, III | .................. | 2/209.13 |

FOREIGN PATENT DOCUMENTS

| | | |
|---|---|---|
| JP | 8-88814 | 4/1996 |
| JP | 8-251511 | 9/1996 |
| JP | 9-292588 | 11/1997 |

* cited by examiner

Primary Examiner—Charles A Marmor
Assistant Examiner—Saúl Rodríguez
(74) Attorney, Agent, or Firm—Fitzpatrick, Cella, Harper & Scinto (57) ABSTRACT

A mounting apparatus allows easy adjustment of the holding position after the apparatus is mounted. The mounting mechanism presses against, at least, two points of a target portion, e.g., the head portion of the user, with at least one holding means (3), so as to detachably mount an apparatus (1) connected to the holding means (3) on the target portion. The holding means (3) includes a roller (10) of which the moving (rotating) direction is limited by a one-way clutch or the like, thereby allowing easy position adjustment after the apparatus is mounted.

20 Claims, 11 Drawing Sheets

MOUNTING MECHANISM AND HEAD MOUNTED APPARATUS

BACKGROUND OF THE INVENTION

The present invention relates to a mounting mechanism for a detachable apparatus such as a head mounted display (to be referred to as an HMD hereinafter) and, more particularly, to a position adjustment mechanism therefor.

A conventional mounting mechanism of this type is comprised of a belt-like fastening means and a member having spring characteristics. An arbitrary apparatus connected to the mounting mechanism is mounted on a target portion (on which the apparatus is to be mounted) by fastening the mechanism around the target portion or pressing against a plurality of portions of the target portion.

Figure 12:
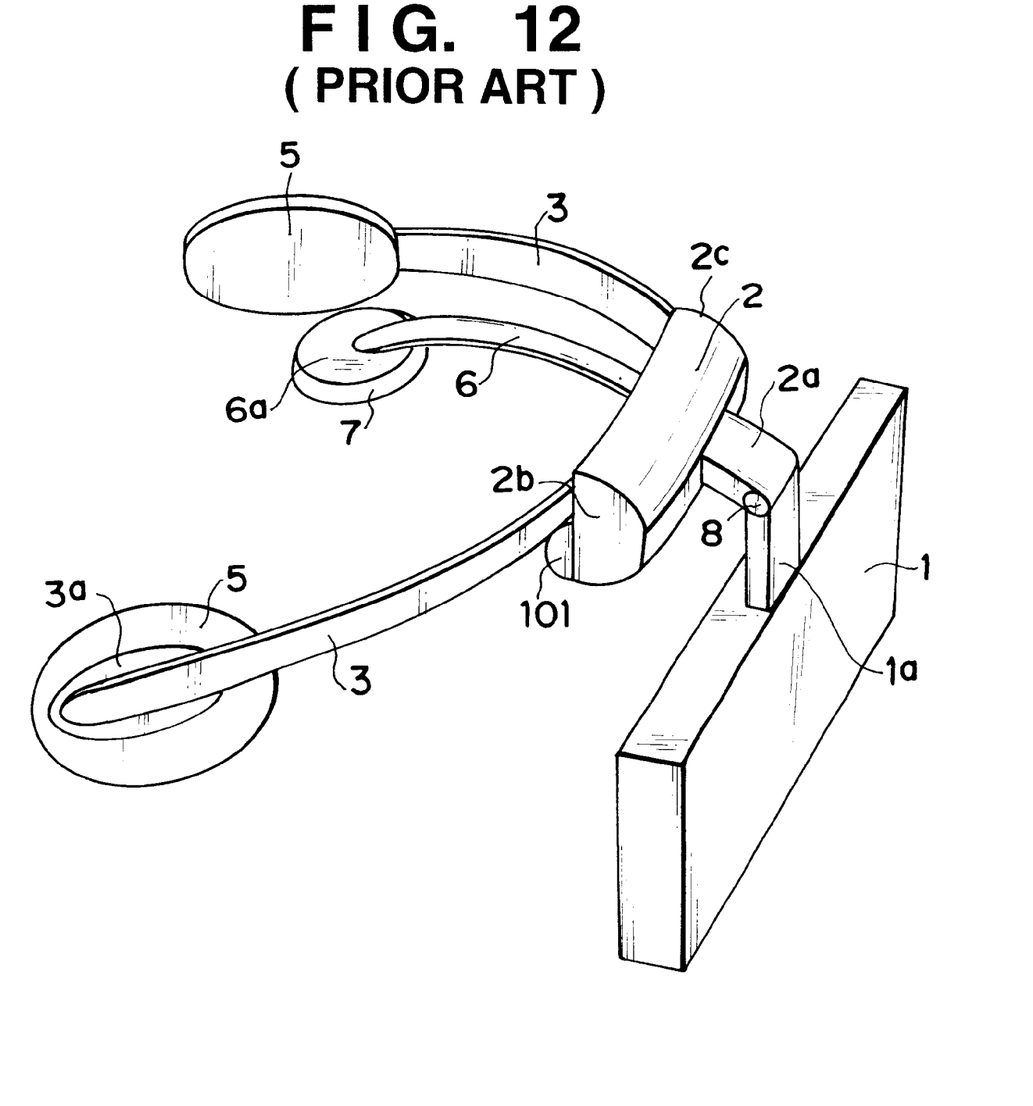
FIG. 12 is a perspective view showing an example of the arrangement of a conventional HMD.

FIG. 12 is a perspective view showing an example of a conventional HMD. Reference numeral 1 denotes a display; and 2, a base on which the display is mounted. The display 1 is rotatably supported on a shaft 8 mounted on an arm portion 2a extending from the base 2 with a predetermined frictional load. The display 1 is therefore supported on the shaft 8 as a support shaft at an arbitrary rotational position. Reference numerals 3 denote press members each having spring characteristics. One end of each press member 3 is fixed to the base 2. A sponge-like pad 5 to be pressed against the temporal portion of a user is detachably mounted on the other end of each of the press members 3 through a pad mount member 3a such as a surface fastener. These press members 3 and pads 5 are symmetrical with respect to the base 2, as shown in FIG. 12.

Reference numeral 6 denotes a press member having spring characteristics and extending upward from the middle portion of the base 2. One end of the press member 6 is fixed to the base 2. A sponge-like pad 7 to be pressed against the parietal portion of the user is detachably mounted on the other end of the press member 6 through a pad mount member 6a such as a surface fastener. Reference numeral 101 denotes a sponge-like pad, which is detachably mounted on the base 2 through a mount member (not shown) like the remaining pads.

Figure 13:
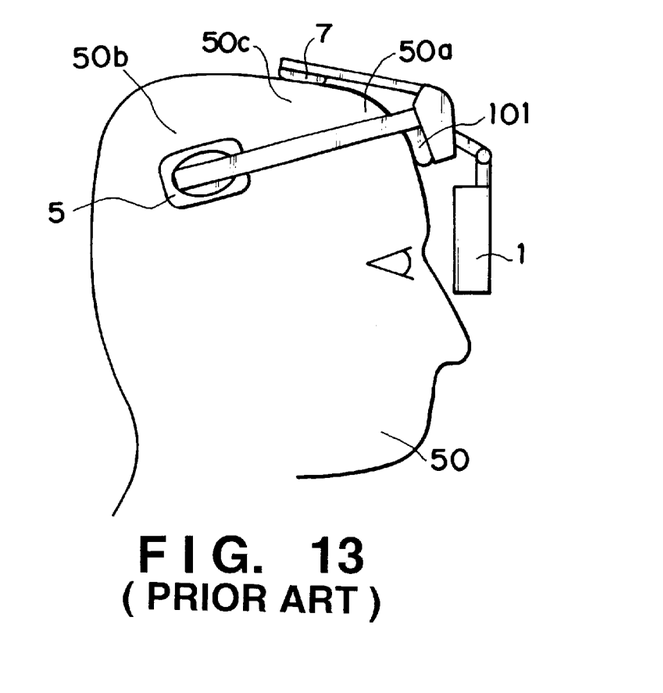
FIG. 13 is a side view showing an example of how the conventional HMD is mounted.

When the user wants to wear the HMD, he/she inserts his/her head portion into the mounting mechanism while spreading out the press members 3 and 6. FIG. 13 is a side view showing a state in which the HMD is mounted on the head portion. The two pads 5 press against temporal portions 50b, the pad 7 presses against a parietal portion 50c, and the pad 101 presses against a forehead portion 50a, thereby holding the display 1 at a predetermined position on the head portion.

Figure 14A:
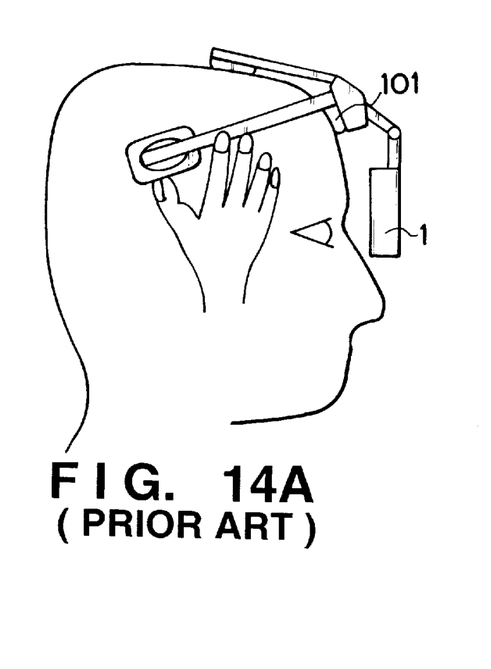
FIGS. 14A and 14B are side views showing a positional shift caused when the conventional HMD is mounted.
Figure 14B:
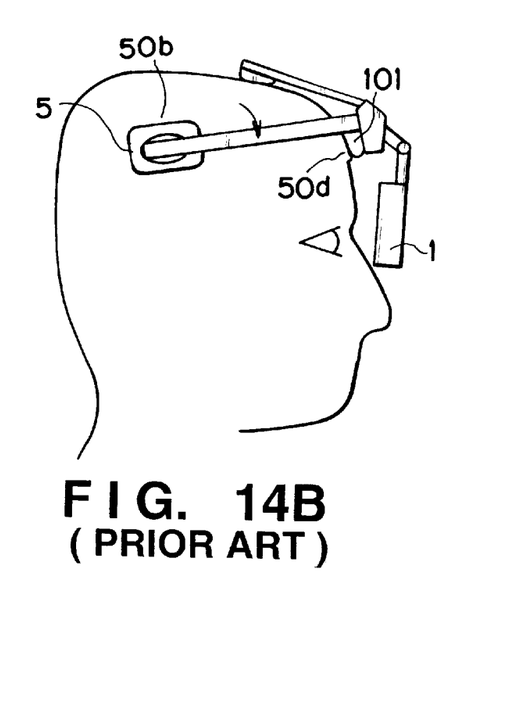

As shown in FIG. 14A, when the user takes his/her hands off the head mounted display after holding the display with his/her hands and setting it at a position where he/she can easily see it, the skin sags (50d) due to the weight of the display 1, as shown in FIG. 14B. As a result, the display 1 rotates clockwise about the pads 5 on the temporal portions and slips down.

The user then raises the display to reset it. Since the pad 101 is pressing against the skin, the positional relationship between the skin and the pad 101 does not change when the display is simply moved upward. For this reason, at the instant when the user takes his/her hands off the display, the display returns to the previous position, and its position cannot be properly adjusted, as shown in FIG. 14B. To adjust the position of the display, the pad 101 must be moved upward with respect to the skin. To do this, the user must take his/her hands off the display at a position slightly higher than a desired position expecting the movement of the display due to the sag of the skin, or must move the display upward exceeding the expected sag of the skin and shift it downward while removing the sag of the skin. In this manner, cumbersome operation is required to adjust the position of the display.

It is an object of the present invention to provide a mounting mechanism which allows easy adjustment of the position of an apparatus after it is mounted.

It is another object of the present invention to provide a head mounted apparatus having a mounting mechanism which allows easy adjustment of the position of an apparatus after it is mounted.

SUMMARY OF THE INVENTION

According to an aspect of the present invention, there is provided a mounting mechanism for pressing against at least two points of a target portion with at least one holding means to detachably mount an apparatus connected to the holding means on the target portion, comprising moving means for moving the apparatus in only substantially one direction relative to the target portion and/or the holding means.

According to another aspect of the present invention, there is provided a head mounted apparatus including a mounting mechanism for pressing against at least two points of a target portion with at least one holding means to detachably mount an apparatus connected to the holding means on the target portion, including moving means for moving the apparatus in only substantially one direction relative to the target portion and/or the holding means.

According to still another aspect of the present invention, there is provided a head mounted apparatus having a mechanism for pressing against at least two points of a head portion with at least one holding means and press means connected to the holding means to detachably mount an apparatus connected to the holding means on the head portion, comprising an arrangement which allows main press means, of the press means, which transmits most of a weight of the apparatus to the head portion when the apparatus is worn, to move relative to the head portion.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The present invention will be described in more detail below with reference to the accompanying drawings.
(First Embodiment)

Figure 1:
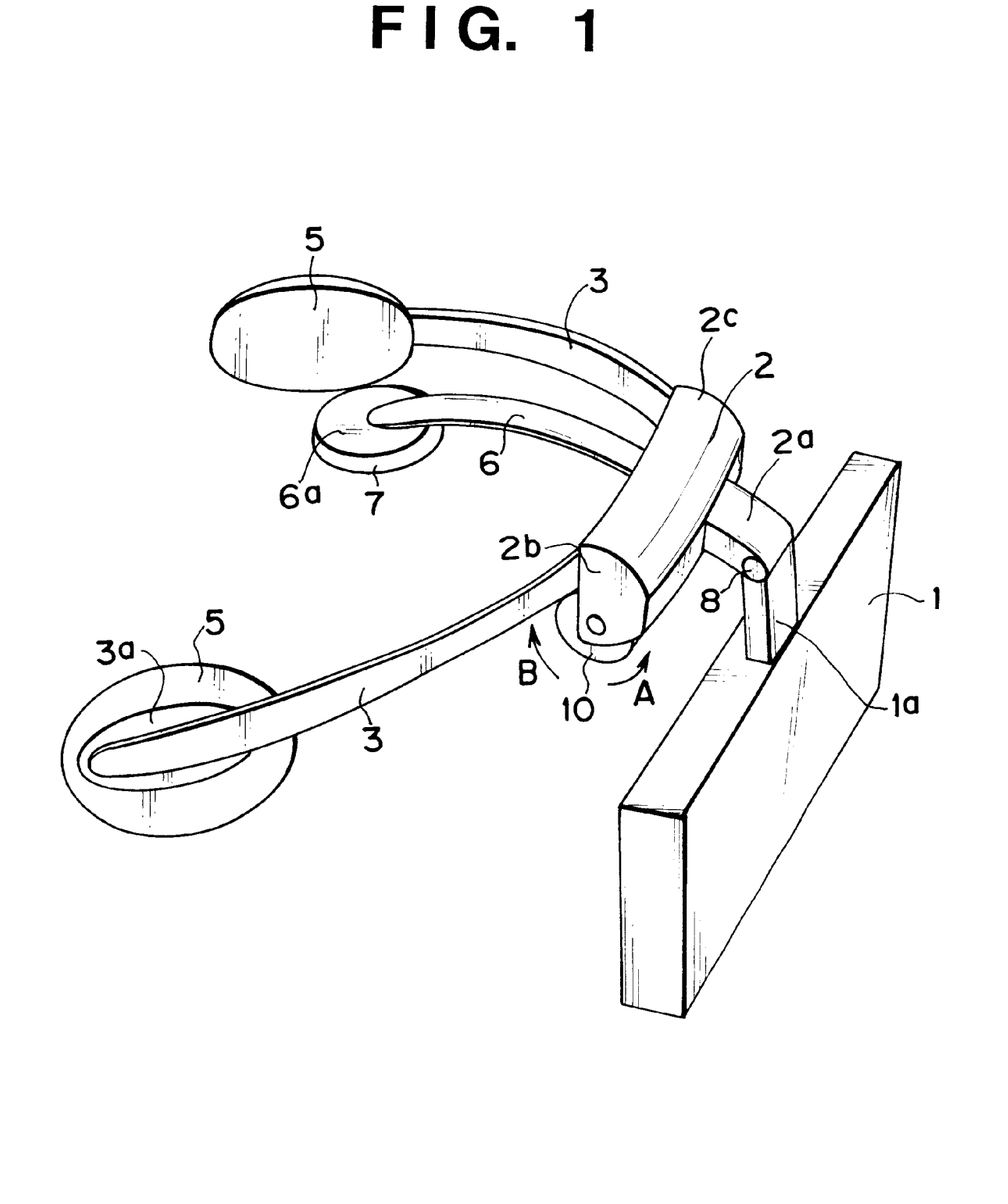
FIG. 1 is a perspective view showing the arrangement of an apparatus according to the first embodiment of the present invention.

FIG. 1 is a perspective view showing the arrangement of an HMD according to the first embodiment of the present invention. The same reference numerals in FIG. 1 denote the same parts as in FIG. 12, and a description thereof will be omitted. In this embodiment, a friction roller 10 replaces the pad 101 in FIG. 12. The friction roller 10 can rotate in the direction indicated by an arrow A in FIG. 1 but cannot rotate in the direction indicated by an arrow B.

Figure 2:
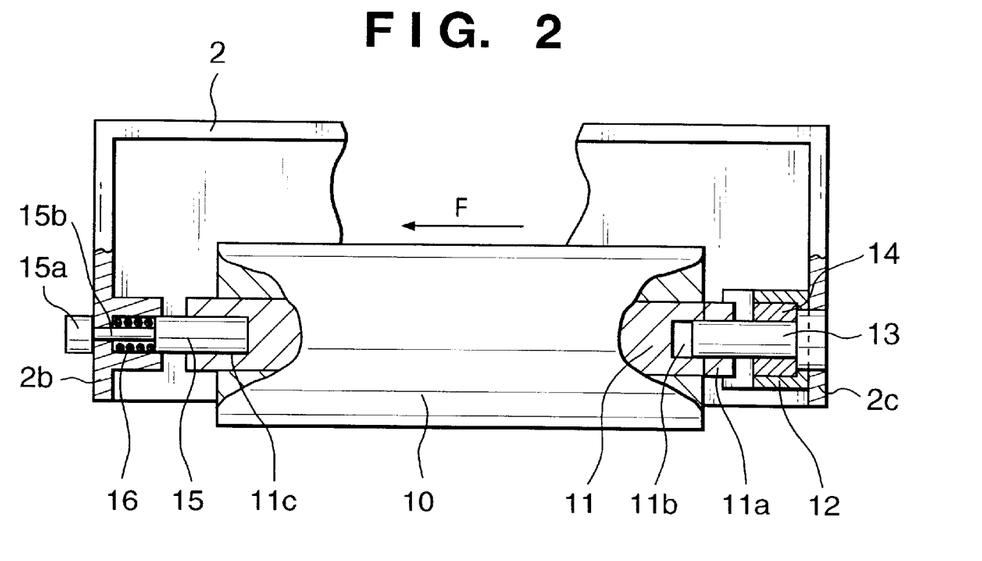
FIG. 2 is a vertical sectional view of a base 2.

The friction roller 10 that is a characteristic feature of this embodiment will be described in detail with reference to FIGS. 2 to 4. FIG. 2 is a vertical sectional view of a base 2. The friction roller 10 is made of a sponge-like material and integrally mounted on the outer peripheral portion of a metal core 11. Holes 11b and 11c are formed in the end faces of the metal core 11. Projections 11a are formed on the end face on the hole 11b side. A shaft 13 formed on a side surface portion of the base 2 is rotatably supported in the hole 11b. A stepped shaft 15 is rotatably supported in the hole 11c. The projections 11a fit in a groove 12a of a clutch holder 12. With this structure, the rotation of the friction roller 10 is restricted in only one direction by the effect of a one-way clutch 14 and the friction roller 10 can be attached/detached by temporarily pressing it in the direction indicated by an arrow F against the biasing force of a spring 16.

The shaft 13 is integrally mounted on one side surface 2c of the base 2. The one-way clutch 14 is mounted on this shaft 13 to be rotatable in only one direction. The one-way clutch 14 is integrally incorporated in the clutch holder 12.

Figure 3:
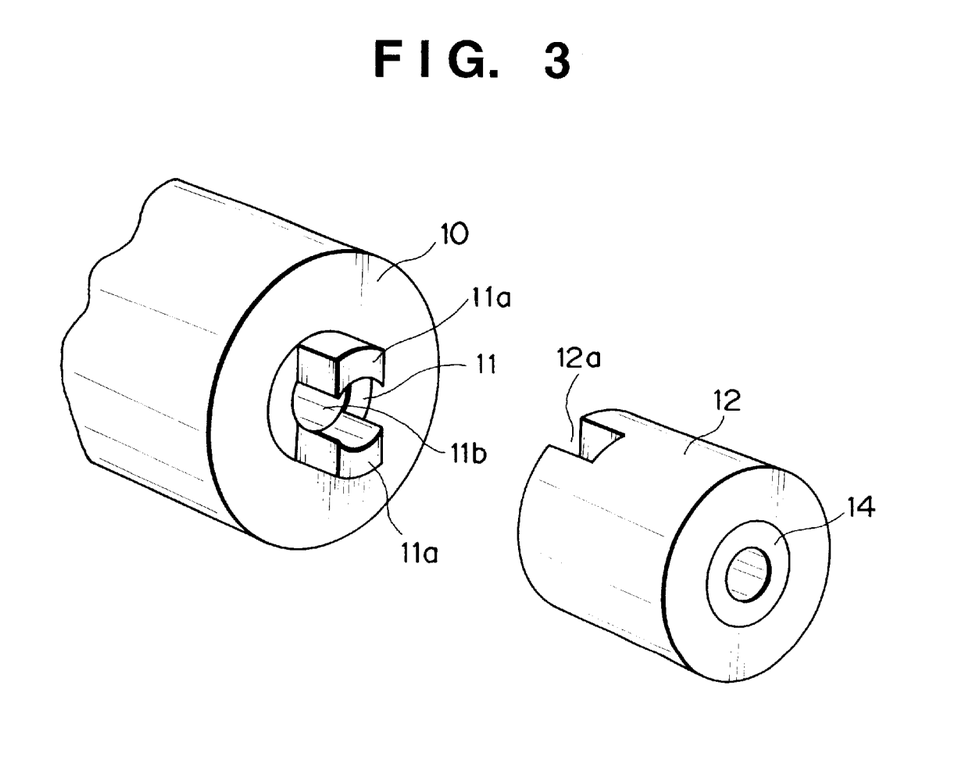
FIG. 3 is a perspective view showing the arrangement of end portions of a frictional roller and clutch holder.

FIG. 3 is a perspective view showing the shapes of the end faces of the clutch holder 12 and friction roller 10 which are to fit with each other. As shown in FIG. 3, the clutch holder 12 has the groove 12a, which fits with the two projections 11a formed on the end face of the metal core 11.

Figure 4:
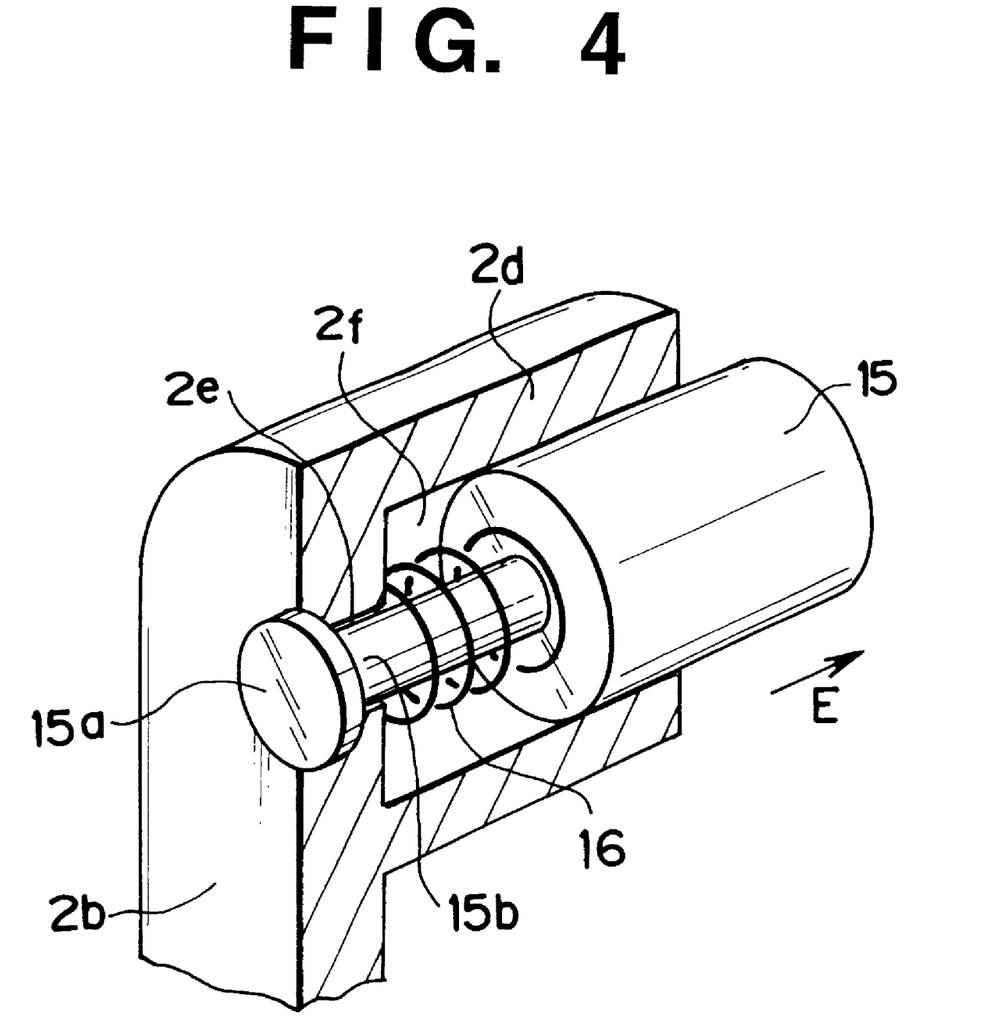
FIG. 4 is a partial sectional view showing the arrangement of a stepped shaft and mount portion of the base.

FIG. 4 shows the mount structure of the friction roller 10 on the other side surface 2b side of the base 2. Holes 2f and 2e are formed in a boss 2d extending from the side surface 2b of the base 2. The stepped shaft 15 having a stopper portion 15a is mounted in these holes to be slidable in the axial direction. The stepped shaft 15 is biased in the direction indicated by an arrow E by the spring 16.

Figure 5:
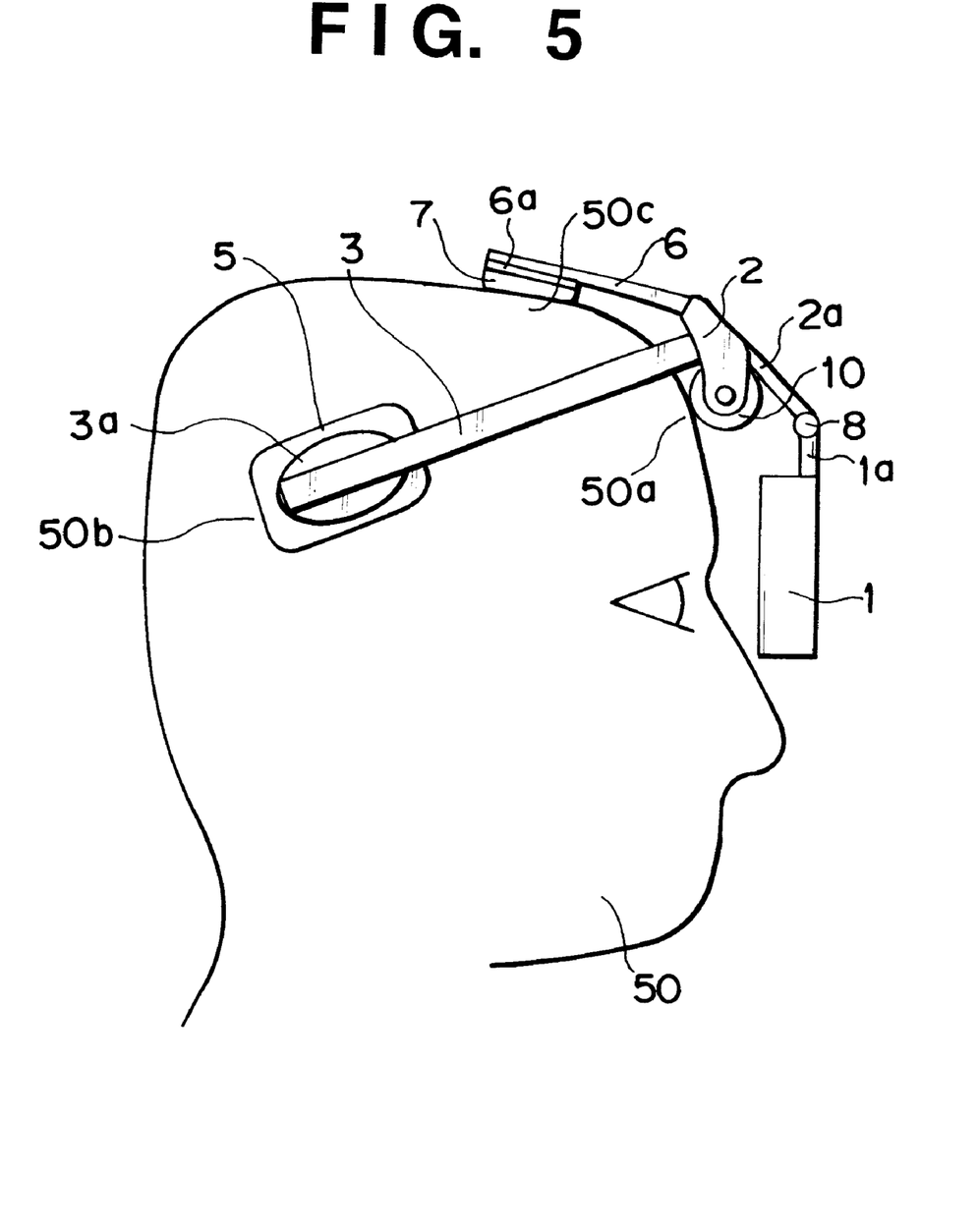
FIG. 5 is a side view showing a mounted state of the apparatus.

FIG. 5 shows a mounted state of the HMD according to this embodiment. The display is fixed on the head of a user 50 by respectively pressing the friction roller 10, pads 5, and pads 7 against the forehead portion, the right and left temporal portions, and the parietal portion.

Position adjustment in this embodiment will be described next with FIGS. 6A to 6C.

When the user is to wear the HMD, he/she first sets the HMD at a position where information displayed on a display 1 can be easily seen (a state in which a position C of the line of sight of the user coincides with an optical axis D of the display; FIG. 6A) while holding the HMD with his/her hands. When the user takes his/her hands off the HMD in this state, the forehead portion receives the weight of the display 1 through the friction roller 10. At this time, the friction roller 10 does not rotate in the direction indicated by the arrow B owing to the effect of the one-way clutch 14, and hence the skin is pulled downward by the frictional force produced by the friction roller 10. Owing to the sag of the skin, the display rotates clockwise almost about the pads 5 pressed against the temporal portions. As a result, as shown in FIG. 6B, the display moves downward, and the position C of the line of sight shifts from the optical axis D.

The user then holds the display with his/her hands and moves it upward (in the direction indicated by an arrow U in FIG. 6B) while the friction roller 10 stays in contact with the forehead portion of the user. At this time, the friction roller 10 rotates in the direction indicated by the arrow A, and only the display moves upward while sag 50d of the skin remains the same and the skin is pulled downward, as shown in FIG. 6C. Since the friction roller 10 does not rotate in the direction indicated by the arrow B owing to the effect of the one-way clutch 14, the friction roller 10 is held at an arbitrary position owing to the frictional force of the friction roller 10.

Figure 6A:
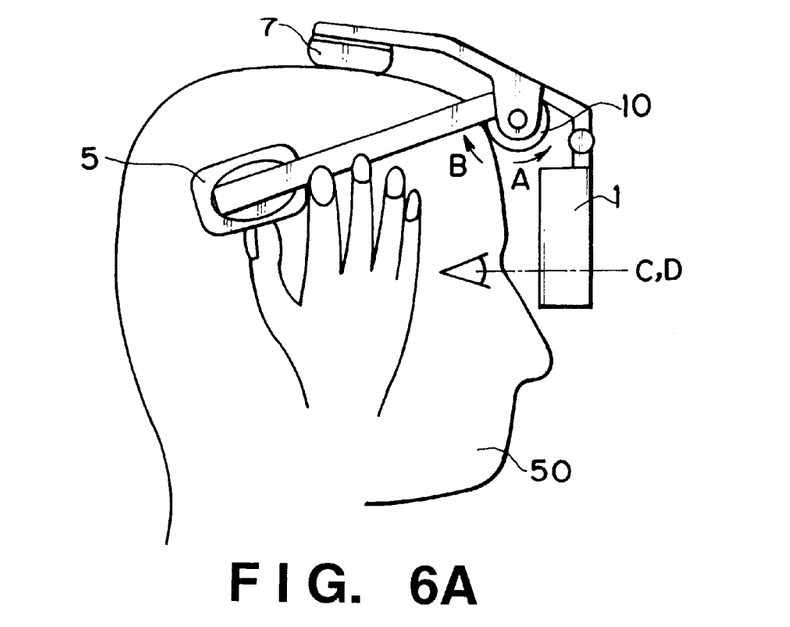
FIGS. 6A to 6C are side views showing a main part to explain the operation of the first embodiment.
Figure 6B:
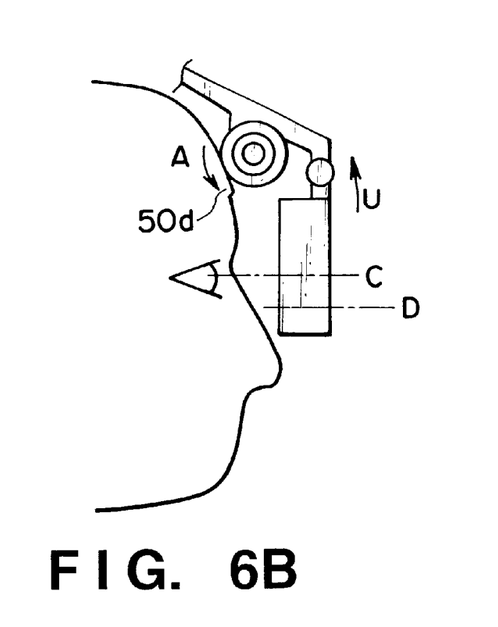
Figure 6C:
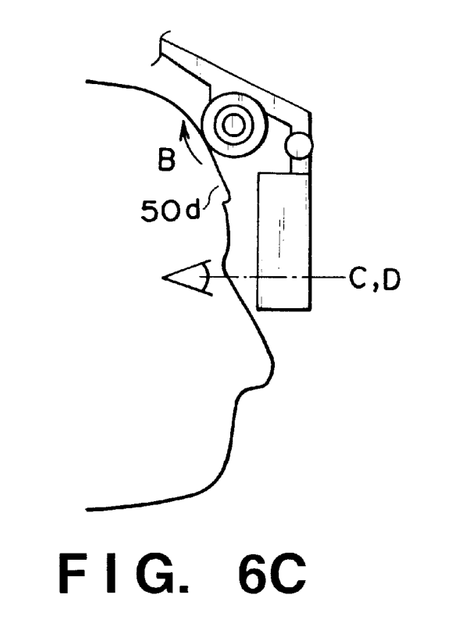

The skin sags downward from the first mount position of the display 1 in FIG. 6A to the position in FIG. 6B owing to the weight of the display 1, and a downward tension is acting on the skin. Since this state is maintained while the display moves upward, the display does not move downward because of the sag of the skin even if the user takes his/her hands off the display in the state shown in FIG. 6C. Therefore, the display 1 can be fixed at a position where the display can be easily seen, i.e., the line of sight C coincides with the optical axis D.
(Second Embodiment)

Figure 7:
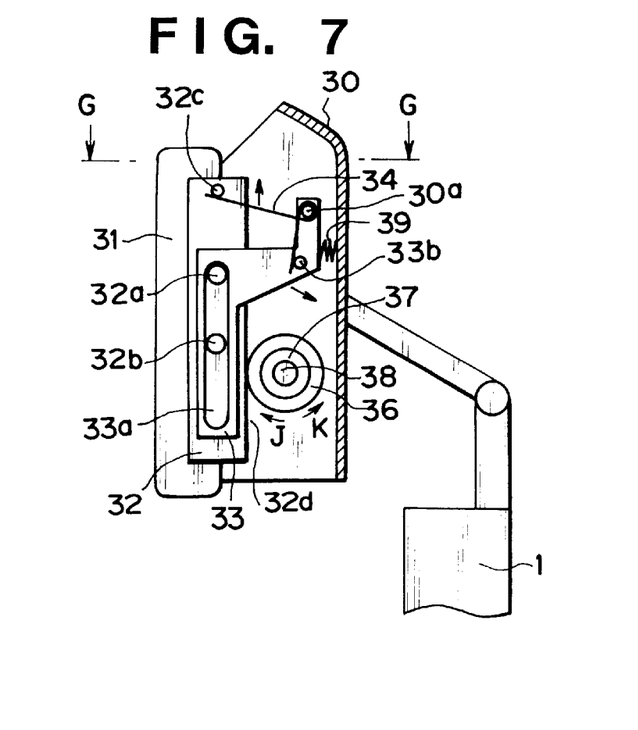
FIG. 7 is a sectional view showing the arrangement of the main part of an apparatus according to the second embodiment of the present invention.
Figure 8:
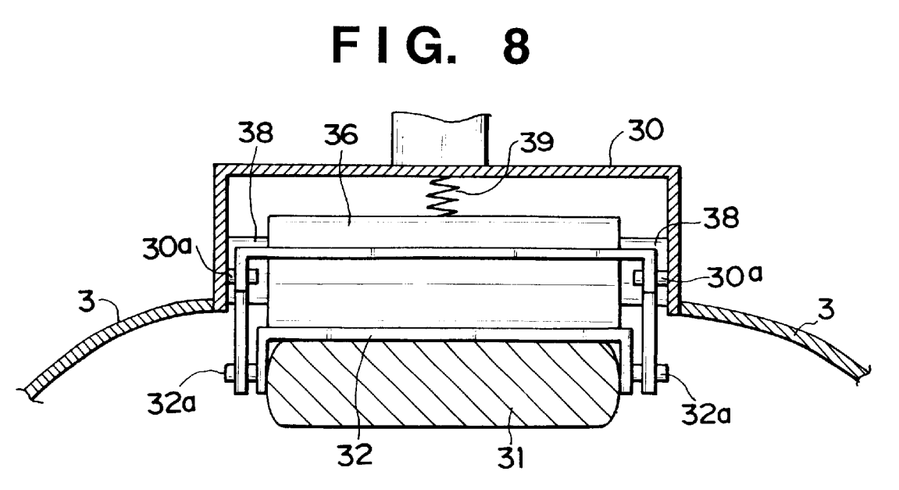
FIG. 8 is a sectional view taken along a line G—G in FIG. 7.

The second embodiment of the present invention will be described with reference to FIGS. 7 and 8. FIG. 7 is a vertical sectional view showing another arrangement of the HMD according to the present invention. FIG. 8 is a sectional view taken along a line G—G in FIG. 7. Although FIGS. 7 and 8 show only a base portion as a characteristic feature of this embodiment and its peripheral portion, other portions can be formed in the same manner as in the first embodiment.

Referring to FIGS. 7 and 8, reference numeral 31 denotes a sponge-like pad having a predetermined elastic force and frictional force and detachably mounted on a pad mount member 32 through a surface fastener or the like (not shown). Pins 32a and 32b are integrally formed on the two sides of the pad mount member 32. These pins fit in an elongated hole 33a of a pad support member 33.

The pad support member 33 is rotatably mounted on a shaft 30a integrally mounted on a base 30. Reference numeral 34 denotes a torsional coil spring that is mounted on the shaft 30a serving as a support shaft while one end is hooked on a pin 32c formed on the pad mount member 32, and the other end is hooked on a pin 33b formed on the pad support member 33. The pad mount member 32, i.e., the pad 31, is biased upward along the elongated hole 33a of the pad support member 33 by the torsional coil spring 34.

This upward biasing force produces a force which is smaller than the frictional force produced between the pad 31 and the forehead portion of the user when he/she wears the HMD, and which is larger enough to move the pad mount member 32 upward along the pad support member 33 when a friction roller 36 is separated from a surface 32d.

Figure 9:
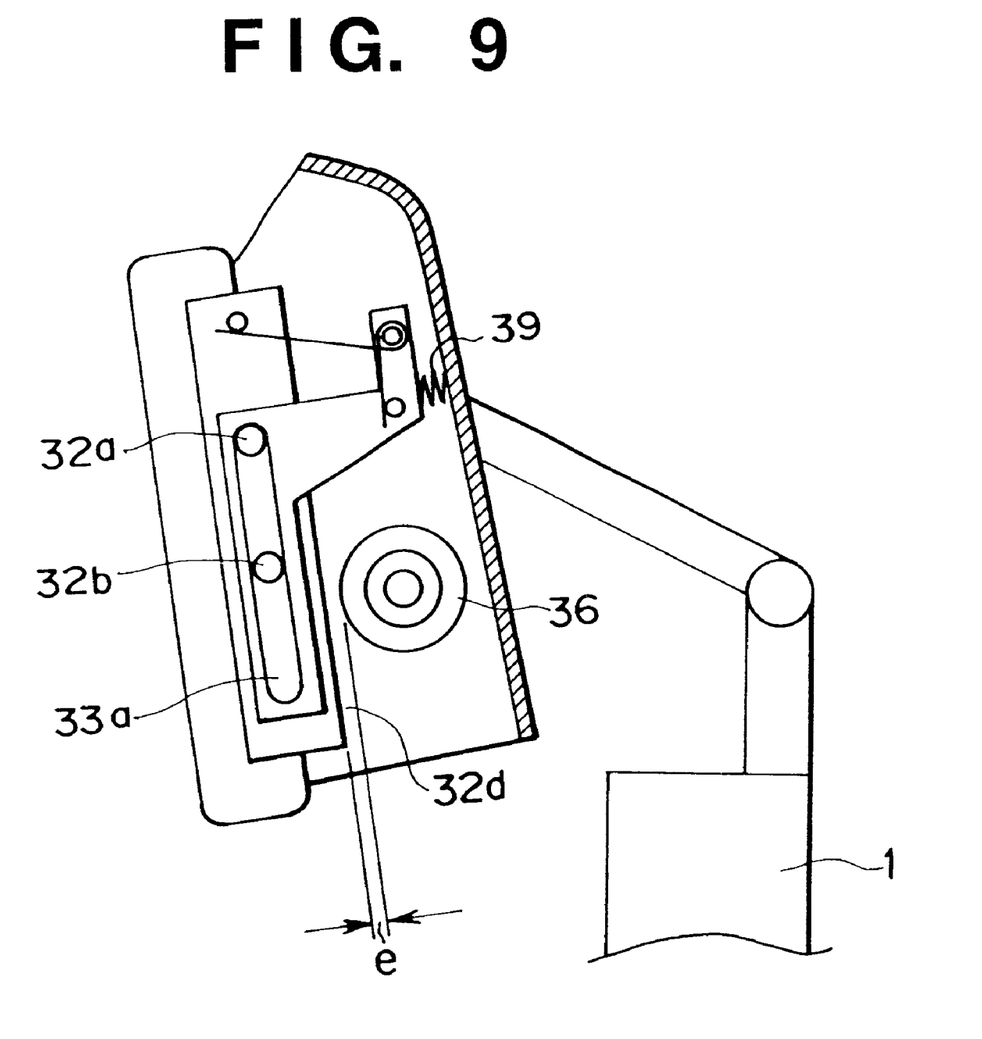
FIG. 9 is a view showing the strength of a compression spring while the apparatus is not mounted.

In addition, the pad support member 33 is biased to rotate clockwise about the shaft 30a by a compression spring 39. As shown in FIG. 9, while the HMD is not worn (the pad 31 can freely rotate about the shaft 30a), the rotation amount of the pad support member 33 is restricted by a stopper (not shown) to maintain a constance gap e between the friction roller 36 and the surface 32d of the pad mount member 32. The biasing force of the compression spring 39 is set to be smaller than the holding force produced by pads 5 pressed against the temporal portions by press members 3.

Reference numeral 36 denotes the friction roller having a predetermined frictional force. This roller is mounted on a shaft 38 integrally formed on the base 30 through a one-way clutch 37.

The one-way clutch 37 is mounted in a direction in which it rotates in the direction indicated by an arrow K but does not rotate in the direction indicated by an arrow J.

Figures 10A, 10B, 10C:
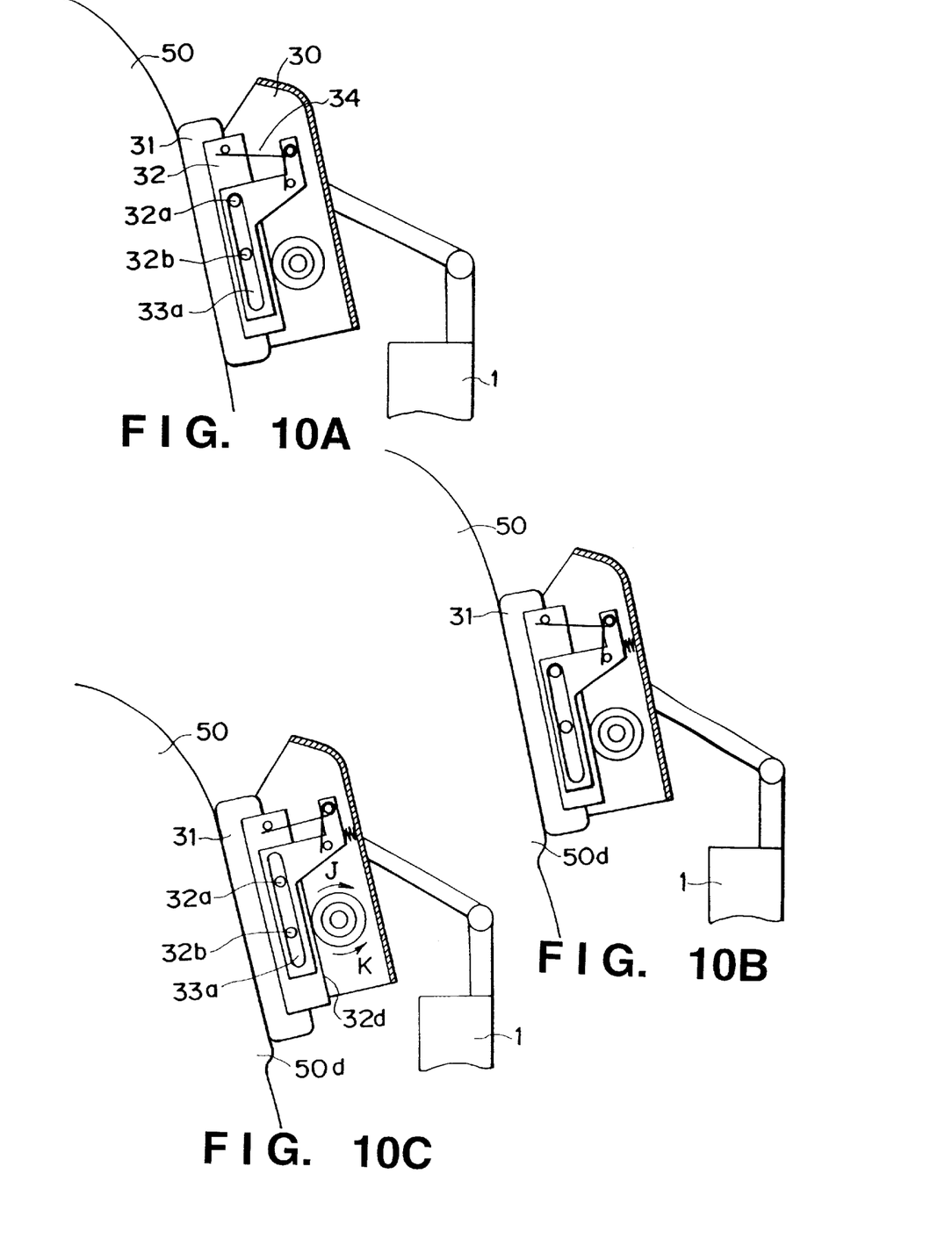
FIGS. 10A to 10C are side views showing a main part to explain the operation of the second embodiment.

The operation to be performed when the user wears the HMD of this embodiment will be described next with FIGS. 10A to 10C. FIGS. 10A to 10C are sectional views showing the operation of the base 30 when the user wears the HMD. Although FIGS. 10A to 10C show only the base portion which is a characteristic feature of this embodiment, other portions (e.g., a mechanism for pressing the HMD against the temporal and parietal portions of the user) may be the same as those of the first embodiment.

When the user wants to wear the apparatus having the above arrangement, he/she holds the head mounted display with his/her hands and sets it at a position where he/she can easily see the display, and then presses the pad 31 against the forehead with a predetermined force (FIG. 10A).

The compression spring 39 keeps the friction roller 36 separated from the pad mount member 32 by a space e until the pad 31 is pressed against the forehead portion. Therefore, the pad mount member 32 is lifted from the pad support member 33 by the biasing force of the torsional coil spring 34, and the pin 32a formed on the pad mount member 32 is in contact with the upper side of the elongated hole 33a.

While the user wears the head mounted display, the friction roller 36 is pressed against the surface 32d of the pad mount member 32 with a predetermined force by the holding force of the pads 5 pressed against the temporal portions by the press members 3 and the elastic force of the pad 31.

When the user takes his/her hands off the display in this state, the weight of the display acts on the forehead portion through the pad 31, and the overall display including the pad 31 and the pad mount member 32 moves downward owing to the sag (50d) of the forehead portion, as shown in FIG. 10B.

When the user lifts the display with his/her hands in this state, the friction roller 36 moves upward while rotating on the surface 32d of the pad mount member 32 in the direction indicated by the arrow K. That is, the pad 31 and the pad mount member 32 do not move, but only the display moves upward while the skin is pulled downward, as shown in FIG. 10C.

When the user takes his/her hands off the display at a position where the optical axis of the display 1 coincides with the line of sight, since the friction roller 36 does not rotate in the direction indicated by the arrow J, the display 1 is held at that position by the frictional force between the surface 32d of the pad mount member 32 and the friction roller 36 without moving downward due to the sag of the skin.

(Third Embodiment)

Figure 11:
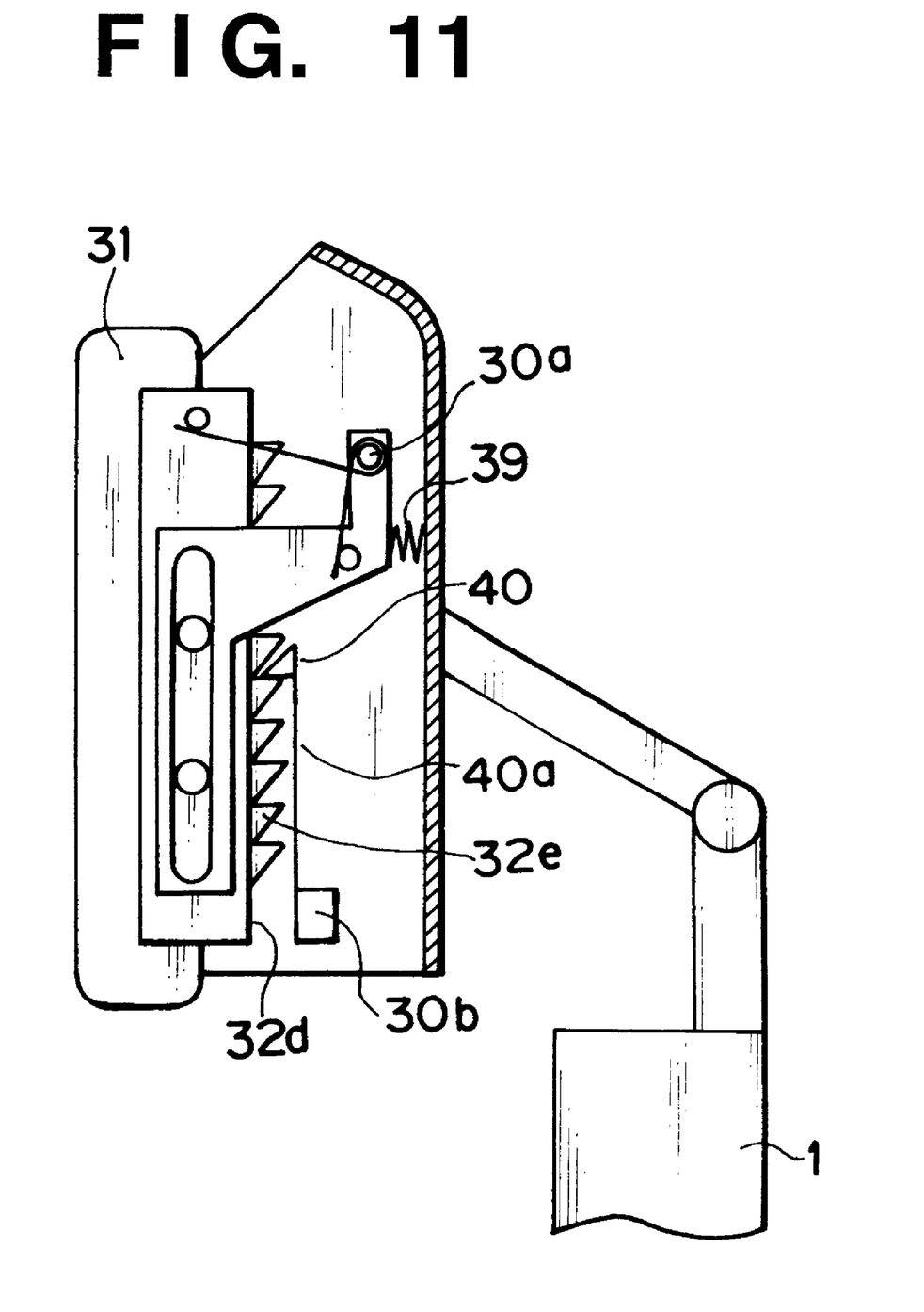
FIG. 11 is a side view showing the main part of the arrangement of the third embodiment of the present invention.

FIG. 11 shows the third embodiment of the present invention. In the third embodiment, a rachet replaces the friction roller and the one-way clutch in the second embodiment. More specifically, a sawtoothed portion 32e is formed on a surface 32d of a pad mount member 32, and a pawl 40 having a spring portion 40a is integrally mounted on a stay 30b formed on a base 30. This structure allows a display 1 to move upward with respect to the pad mount member 32.

In this embodiment, the strength of a compression spring 39 is adjusted to ensure a predetermined space between the sawtoothed portion 32e and the pawl 40 while the HMD is not worn (the pad 31 can freely rotate about a shaft 30a) and cause the sawtoothed portion 32e to mesh with the pawl 40 due to the holding power of the pads 5, forced to the temporal portion by the press members 3, and the elasticity power of the pad 31 when the HMD is worn. In this embodiment, the amount of rotation of the pad mount member 32 is limited by a stopper (not shown) as in the second embodiment.

According to the second and third embodiments, since the area of the portion in contact with the skin can be made larger than the roller-like pad in the first embodiment, the user can wear the HMD more comfortably, and can move the display upward more stably.

In the third embodiment, a ratchet mechanism comprised of the sawtoothed portion 32e and the pawl 40 is used. However, any member having enough frictional power can be used as substitutes for the sawtoothed portion 32e and the pawl 40. In this case, the display can be adjusted upward by lifting up the display slightly to make a space between friction members, adjusting the display to an appropriate position and causing the friction members to move in contact again by lowering the display. This process provide the display to maintain a predetermined position and prevents the display from slipping.

The present invention can be applied most effectively to a pad that transmits most of the weight of the apparatus the user is wearing to the body portion supporting it but is not necessarily limited to any specific portion. In this embodiment, the present is applied to the pad on the support portion of the display which is to be pressed against the forehead portion of the user. Obviously, however, the present invention can be applied to any portion. For example, the present invention may be applied to the pads on the holding portions, e.g., the pads 5, which come into contact with the temporal portions or the like.

The effect of the present invention is noticeable when fine adjustment is required after the user wears the apparatus or when a positional shift tends to occur due to the weight of the apparatus after the user wears it as in the embodiments described above. The body portion on which the user wears the apparatus or the apparatus to which the present invention is applied are not limited the head portion and the display. The present invention can be applied to a mounting mechanism for allowing the user to wear an arbitrary apparatus on an arbitrary portion.

Although a one-way moving means is preferably used, the present invention is not limited to this as long as a positional shift does not occur when the user wears the apparatus. For example, the above embodiments may use a rotating mechanism having a sufficiently heavy load in downward movement as compared with upward movement. In addition, as a one-way moving means, any means such as a combination of a ratchet and a press pawl may be used. This one-way moving means may be set at any position where the display and the body portion on which the user wears the apparatus can move relative to each other.

As described above, the mounting mechanism, which is used to detachably mount the apparatus connected to the holding means on a portion where the user wears the apparatus by pressing at least two points of the portion using at least one holding means, includes the moving means for the apparatus in only one direction relatively and substantially with respect to the portion where the user wears the apparatus and/or the holding means. With this structure, even if the apparatus shifts from the position where the apparatus is mounted at first, the position of the apparatus can be easily adjusted.

According to the head mounted type apparatus to which the present invention is applied, and more specifically the HMD, even if the skin sags due to the weight of the HMD, and display shifts downward, the display can be easily moved to an optimal position by only moving the display upward while the pad for holding the display is kept in tight contact with the skin. In addition, the amount by which the display is moved upward corresponds to the sag of the skin and hence is small. Therefore, there is no need to perform tedious operation as in the prior art, i.e., moving the display upward by an amount larger than the amount by which the display moves downward due to the sag of the skin, pressing the pad against the skin from above to eliminate the influence of the sag of the skin, and moving the display to an optimal position while removing the sag of the skin.

As many apparently widely different embodiments of the present invention can be made without departing from the spirit and scope thereof, it is to be understood that the invention is not limited to the specific embodiments thereof except as defined in the appended claims.

What is claimed is:

1. A mounting mechanism comprising:

at least one holding means for pressing against at least two points of a target portion to detachably mount an apparatus connected to said holding means on the target portion; and moving means for moving said apparatus in only substantially upward direction relative to the target portion and/or said holding means.

2. The mechanism according to claim 1, wherein said moving means is set at least at one point at which said holding means presses against the target portion.

3. The mechanism according to claim 1, wherein said moving means is rotating means mounted on a shaft which moves together with said holding means.

4. The mechanism according to claim 1, wherein said moving means also serves as support means which is set to be movable relative to said holding means and supports said apparatus.

5. The mechanism according to claim 4, wherein the relative moving direction includes an anti-gravity direction component.

6. The mechanism according to claim 1, wherein said moving means includes a one-way clutch.

7. The mechanism according to claim 1, wherein said moving means includes a ratchet.

8. The mechanism according to claim 1, wherein said moving means is a mechanism using a frictional force.

9. The mechanism according to claim 1, wherein said apparatus is a display, and the target portion is a head portion.

10. The mechanism according to claim 1, wherein the target portion is a head portion, said holding means includes forehead portion press means which presses against at least a portion of the forehead portion, and said moving means functions as said holding means.

11. A head mounted apparatus comprising said mounting mechanism defined in claim 1.

12. The apparatus according to claim 11, wherein said apparatus to be mounted is display means.

13. A head mounted apparatus having a mechanism for pressing against at least two points of a head portion with at least one holding means and at least one press means connected to said holding means to detachably mount an apparatus connected to said holding means on the head portion, comprising:

an arrangement which allows one of said at least one press means, which transmits most of the weight of said apparatus to the head portion when said apparatus is worn, to move in only substantially upward direction.

14. The apparatus according to claim 13, wherein said main press means presses against a forehead portion.

15. The apparatus according to claim 13, wherein said main press means rotates to make the relative movement.

16. The apparatus according to claim 13, wherein the relative movement exhibits a larger load in movement in a downward direction than in an upward direction.

17. The apparatus according to claim 13, further comprising limiting means for limiting the relative movement to movement in the upward direction.

18. The apparatus according to claim 17, wherein said limiting means includes a one-way clutch.

19. The apparatus according to claim 17, wherein said limiting means includes a ratchet.

20. The apparatus according to claim 17, wherein said limiting means functions only in a mounted state of said apparatus.

* * * * *

Disclaimer 6,378,390—Yoshihiro Saito, Hachioji, Japan. MOUNTING MECHANISM AND HEAR MOUNTED APPARATUS. Patent dated April 30, 2002. Disclaimer filed June 3, 2002 by the assignee, Mixed Reality Systems Laboratory Inc.

Hereby enter this disclaimer to all claims (1-20) of said patent.

*(Official Gazette, August 20, 2002)*